(12) United States Patent (10) Patent No.: US 8,788,740 B2
Atri et al. (45) Date of Patent: Jul. 22, 2014

(54) DATA COMMIT ON MULTICYCLE PASS COMPLETE WITHOUT ERROR

(75) Inventors: Sunil Atri, Austin, TX (US); Robert Brent France, Austin, TX (US); Walter Allen, Wellington, CO (US)

(73) Assignee: Spansion LLC, Sunnyvale, CA (US)

( * ) Notice: Subject to any disclaimer, the term of this patent is extended or adjusted under 35 U.S.C. 154(b) by 535 days.

(21) Appl. No.: 11/963,200

(22) Filed: Dec. 21, 2007

(65) Prior Publication Data

US 2009/0164750 A1 Jun. 25, 2009

(51) Int. Cl.
*G06F 12/02* (2006.01)

(52) U.S. Cl.
USPC ....... 711/103; 711/154; 711/209; 365/185.33

(58) Field of Classification Search
USPC .................. 711/103, 154, 209; 365/185.33
See application file for complete search history.

(56) References Cited

U.S. PATENT DOCUMENTS

| | | | |
|---|---|---|---|
| 5,530,673 A * | 6/1996 | Tobita et al. | 365/185.09 |
| 6,272,607 B1 * | 8/2001 | Baentsch et al. | 711/162 |
| 7,139,199 B2 * | 11/2006 | Srinivasan et al. | 365/185.22 |
| 7,610,445 B1 * | 10/2009 | Manus et al. | 711/113 |
| 2007/0214309 A1 * | 9/2007 | Matsuura et al. | 711/103 |
| 2008/0162782 A1 * | 7/2008 | Suresh et al. | 711/103 |
| 2008/0250195 A1 * | 10/2008 | Chow et al. | 711/103 |

OTHER PUBLICATIONS

"MirrorBit Write Buffer Programming and Page Buffers", May 2, 2006, Spansion LLC, Write-Page_Buffer_AN, Revision 1. Retrieved on May 23, 2011 from <www.spansion.com/Support/AppNotes/write-page_buffer_an_01.pdf>.*

"MirrorBit Flash Memory Write Buffer Programming and Page Buffer Read", Oct. 4, 2011, Advanced Micro Devices, Inc., Publication# 25539, Rev: A, Amendment/0. Retrieved on Aug. 12, 2013 from <http://www.datasheet5.com/download?product=494372&fp=edekrevm>.*

* cited by examiner

*Primary Examiner* — Arpan P. Savla

(74) *Attorney, Agent, or Firm* — Amin, Turocy & Watson, LLP

(57) ABSTRACT

A system and methodology that can prevent errors during data commit on multicycle pass complete associated with a memory is provided. The system employs a transaction buffer component in the memory that receives and temporarily stores information associated with a transaction. A controller component programs subsets of data to respective memory locations once the entire transaction is completed based on the information stored in the transaction buffer component. Thus, if the transaction is interrupted during the transfer of the user data into the buffer, the data stored in the memory is not affected and can still contain the original data when power is regained. If the data transfer between the transaction buffer component and memory array is interrupted, the controller component can complete the transfer from the point of interruption on regaining power and can avoid partial storage of data.

19 Claims, 11 Drawing Sheets

DATA COMMIT ON MULTICYCLE PASS COMPLETE WITHOUT ERROR

TECHNICAL FIELD

The subject innovation relates generally to memory systems and in particular, to systems and/or methodologies that can avoid an error during data commit on multicycle pass.

BACKGROUND

One area of recent advancement is the development of different memory types, each with different characteristics. An important aspect of a majority of electronic devices is the ability to store information in digital memory, which stores information as a series of I/Os. Digital memory is a broad category with many different types of subset memory. One memory type is read-only memory (ROM). ROM is a non-volatile memory type that a system can write to only once. Non-volatile memory can retain information without a constant source of power. The system can read the information stored in the memory, but it cannot re-write new information to the memory. Oftentimes, memory writing takes place during the manufacturing process, thus many times a consumer never writes to ROM memory.

One of the basic memory types created for alleviating these flaws in ROM is Electrically Erasable Programmable Read Only Memory (EEPROM), which is both non-volatile and capable of multiple writes and reads. However, EEPROM is rather expensive to manufacture, thus making it impractical for most personal applications. Flash memory technology is an alternative to EEPROM. In addition to being readable, re-writable (e.g., erased and written to again), and non-volatile, flash memory is relatively cheap to mass-produce. The economic factor makes flash memory much more appropriate for personal applications, such as storing of digital photographs and storing digital music files. Flash memory devices generally have a life span of about one million programming cycles.

Conventionally, software driving the flash memory writes in "chunks" of data optimized to suit the file system in a stack or the flash memory. Typically, the chunks of data are not optimized with respect to the manner in which a user writes data. In the case of the flash block driver, user data can be multiple sectors of data for example a File Allocation Table (FAT) table. In the case of a file system database application, user data can be multiple files that have to be updated or written at the same time.

During a transaction, new data can be written into the flash memory in chunks. However, if the transaction is interrupted (e.g. due to power loss), partial data can be stored onto the flash memory. This can lead to corrupt user data. Furthermore, a write command in the flash memory can consist of up to a maximum of one flash buffer worth of data in contiguous flash memory address range. User data, on the other hand, can be composed of data that may or may not be contiguous in nature. Conventional flash memory systems do not comprehend multiple writes being treated as one write. In the case where the data is not contiguous or the data size is larger than the flash buffer size, or both, it is desired to ensure a series of changes make it through as one transaction and/or in the event of a failure, the partial changes made are rolled back.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate reduction and/or prevention of errors during data commit in a memory that can occur if a transaction is interrupted before completion. The memory can include a transaction buffer component that can be employed to temporarily store user data associated with a transaction. When the transaction is completed, the user data can be transferred to the appropriate memory locations (contiguous and/or non-contiguous memory locations). Thus, even if an interruption occurs during the transfer of data into the buffer, partial user data is not stored into the memory locations.

In accordance with another aspect of the system, a transaction bit component can determine the start and end of a transaction and accordingly set or reset transaction bits. The transaction bit component can determine the number of blocks of data that are employed in the initiated transaction. In one aspect, after the specified number of blocks have been programmed, the transaction bit component can automatically determine that the transaction has ended and can set a transaction end bit. In another aspect, a notification can be provided to the transaction bit component that a particular programming operation associated with programming data to multiple blocks is the last operation for such program command (e.g., for that transaction), and the transaction bit component can set the transaction end bit. Furthermore, the transaction identification component can be explicitly instructed by an application programming interface (API) regarding the beginning and end of a transaction by a command and/or a flag.

Another aspect of the subject innovation comprises a controller component that can program appropriate memory locations with data from the transaction buffer component based in part on the transaction bit information. When the transaction end bit is set, indicating that a transaction has been completed, the controller component can transfer the data from the transaction buffer component to a respective memory location. Furthermore, the controller component can track the data that has been transferred, such that, if the transfer is interrupted, the transfer can resume and be completed successfully.

Yet another aspect of the disclosed subject matter relates to a method that can avoid partial storage of new data in accordance with an aspect of the subject innovation. In one aspect, the methodology can set a transaction start bit and receive information associated with a transaction into a transaction buffer component. Once the entire transaction is completed, a transaction end bit can be set and the data from the transaction buffer component can be transferred to appropriate memory locations.

The following description and the annexed drawings set forth certain illustrative aspects of the specification. These aspects are indicative, however, of but a few of the various ways in which the principles of the specification may be employed. Other advantages and novel features of the innovation will become apparent from the following detailed description of the specification when considered in conjunction with the drawings.

DETAILED DESCRIPTION

Figure 1:
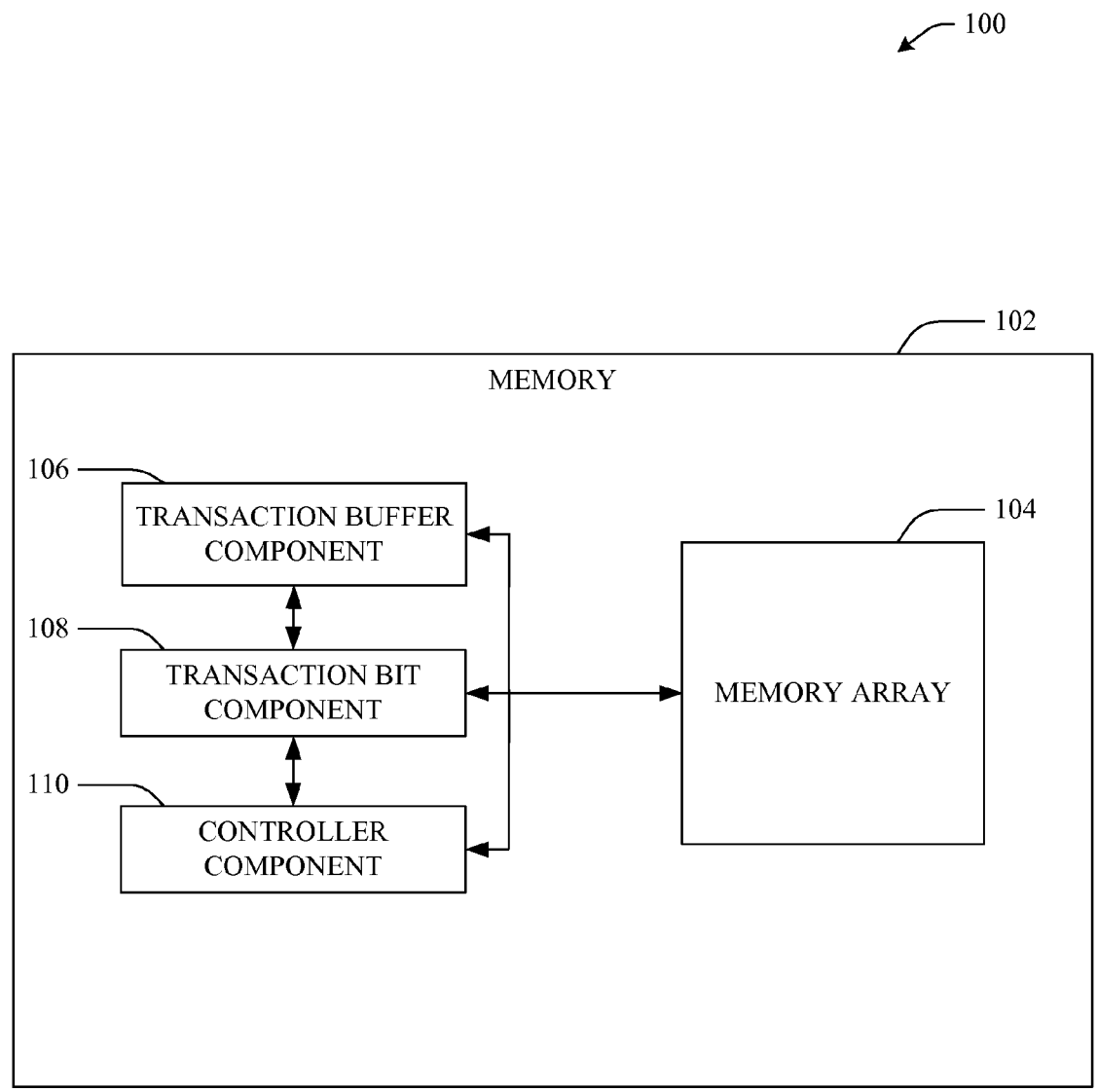
FIG. 1 illustrates an example system that can prevent corrupt user data during a transaction in memory in accordance with an aspect of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "component," "module," "system", "interface", or the like are generally intended to refer to a computer-related entity, either hardware, a combination of hardware and software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Traditional systems can write data into flash memory in chunks. During most transactions, multiple chunks of data can be written into the flash memory. However, an error can occur if the transaction is interrupted. If the transaction is interrupted (e.g. due to power loss), partial data can be stored onto the flash memory leading to corrupt user data.

Systems and/or methods are presented that can avoid corrupt user data during a transaction in a memory (e.g., flash memory). The memory can include a transaction buffer component that can be employed to temporarily store user data, and upon completion of a transaction, the controller component can facilitate transferring the user data from the transaction buffer component to appropriate memory locations (contiguous and/or non-contiguous memory locations). Thus, even if an interruption occurs during the transfer of data into the transfer buffer component, partial user data is not stored into the memory locations.

Referring initially to FIG. 1, illustrated is an example system 100 that can facilitate reducing and/or preventing corrupt user data during a transaction associated with a memory 102 in accordance with an aspect of the disclosed subject matter. The memory 102 can comprise non-volatile memory, such as a flash memory device (e.g., single-bit flash memory, multi-bit flash memory), and/or volatile memory (e.g., static random access memory (SRAM)). In one aspect, the memory 102 can be comprised of NAND memory and/or NOR memory. The memory 102 can include a memory array 104 that can receive and store data. The memory array 104 can include a plurality of memory cells (not shown) wherein each memory cell can store one or more bits of data. Data stored in a memory cell(s) in the memory array 104 can also be read and such data can be provided as an output.

Various transactions can be performed on each memory cell, for example, programming, reading, and/or erasing associated with data. Typically, a programming transaction can involve a series of memory write operations to write associated pieces (e.g., chunks) of data to contiguous or non-contiguous memory locations. In one aspect, the memory locations in the memory 102 can be programmed in chunks or blocks of a specific size. Often, a large amount of data can be programmed into the memory 102 such that the amount of data can be greater than the block size. System 100 can facilitate reducing and/or preventing corruption of programmed data by initially storing user data in a buffer and transferring the data from the buffer into the appropriate memory location only after the entire transaction is complete.

In accordance with an aspect, memory 102 can include a transaction buffer component 106 that can be employed to temporarily store user data associated with a data transaction. In one aspect, the transaction buffer component 106 can comprise one or more dedicated erase blocks of memory (e.g., non-volatile memory). The one or more dedicated erase blocks can be employed in a random and/or selective manner in order to facilitate reducing the wear on each block during transactions. Memory 102 can further include a transaction bit component 108 that can set and/or reset a transaction start and a transaction end bit to determine the beginning and end of a transaction.

As an example, the transaction bit component 108 can identify when an application programming interface (API) or other component (not shown) initiates a transaction to transfer data to the memory 102 and can set a transaction start bit. Furthermore, the transaction bit component 108 can determine and/or can receive information regarding the number of blocks of data that are programmed in the initiated transaction. Once the identified number of blocks have been transferred to the transaction buffer component 106, the transaction bit component 108 can determine that the transaction has ended and can set the transaction end bit. As another example, the transaction bit component 108 can determine when a transaction is started by an API and determine the completion of the transaction when an end of transaction is indicated by the API, and can set the transaction start bit and transaction end bit accordingly. Alternately, as yet another example, the transaction bit component 108 can receive flags respectively associated with the start and end of a transaction. On receiving a flag associated with the initiation of a transaction, the transaction bit component 108 can set the transaction start bit and/or on receiving a flag associated with the completion of the transaction, the transaction bit component 108 can set the transaction end bit. Although only three techniques are described above to determine the beginning and/or end of a transaction, it can be appreciated that most any technique can be employed by the transaction bit component 108 to determine when a transaction is started and/or when the transaction ends and accordingly set/reset the transaction start bit and/or transaction end bit.

When the transaction start bit is set by the transaction bit component 108, the transaction buffer component 106 can start receiving subsets of user data associated with a transaction. The transaction buffer component 106 can store each subset of received user data along with the address of the memory location where the subset of data can be stored, and/or the size of the subset of user data. When all the subsets of user data are received by the transaction buffer component 106, the transaction end bit can be set by the transaction bit component 108.

In accordance with another aspect, a controller component 110 can be employed to facilitate transferring the received user data in the transaction buffer component 106 to the specified memory locations (contiguous or non-contiguous) in the memory array 104. When the transaction end bit is set, the controller component 110 can facilitate transferring each subset of data in the transaction buffer component 106 to a memory location specified by the address stored in the transaction buffer component 106 associated with that subset of data. Furthermore, the controller component 110 can track the subsets of data that are transferred from the transfer buffer component 106 to the respective memory locations, such that, if the transfer is interrupted, for example, due to power loss, the transfer can continue from the point where the interruption occurred in order to complete the data transfer. When the data transfer is completed, the transaction bit component 108 can reset the transaction start and end bits. Furthermore, the controller component 110 can facilitate erasing the transaction buffer component 106, or a portion thereof (e.g., the blocks that were utilized during the most recent transaction) when the data transfer is successfully completed. In accordance with another aspect, the controller component 110 can facilitate selectively updating data stored in memory locations as part of a transaction. The controller component 110 can determine the subsets of data related to a transaction that are being updated, for example, by comparing the data in the transaction buffer component 106 and the memory array 104 and can selectively update only those subsets of data that have been modified, while copying the unmodified subsets of data to a new memory location or keeping the unmodified subsets of data in their current memory locations, as desired.

As an example, if a user would like to copy a file, as updated, into the memory 102 to update or replace a file stored in the memory 102, the user can initiate the copy transaction (e.g., program operation). A command(s) can be generated to copy (e.g., program) the file into the memory 102. The command(s) can provide information regarding the transaction, such as the size of the transaction, the size of respective pieces of data associated with the file, the number of pieces of data to be transacted, the number of write operations associated with the transaction, the respective memory locations where the respective pieces of data are to be stored, and/or an indicator of the end of the transaction, etc. The transaction bit component 108 can determine the beginning of the transaction and set the start transaction bit. The file can then be copied into the transaction buffer component 106. When the transaction bit component 108 determines that the transaction is complete (e.g., the file has been copied to the transaction buffer component 106), the transaction bit component 108 can set the end transaction bit. The controller component 110 can transfer the data from the transaction buffer component 106 into the specified memory locations in memory array 104. In one aspect, the controller component 110 can determine the memory locations in the memory array 104 that have been changed based on the data from the transaction buffer component 106 and can selectively update or modify only those memory locations.

If the copy transaction is interrupted, for example, due to a loss of power, during the transfer of the file into the transaction buffer component 106, the data stored in the memory array 104 is not affected and can still contain the original data of the file when power is regained. Furthermore, if the transaction is completed to the transfer buffer component 106, and data transfer between, the transaction buffer component 106 and memory array 104 is interrupted, the controller component 110 can facilitate completing the transfer from the point of interruption upon regaining power. If there is no interruption (e.g., power loss) during the transaction, the updating of the file can be completed.

As another example, which can involve a modification of only certain portions of a set of data, if there are 10 original subsets of data that are respectively stored in memory locations 1-10 in the memory array 104, and a transaction is initiated to update the subsets of data in memory locations 2-7, the modified subsets of data to update the data stored in the memory locations can be transmitted to the transaction buffer component 106, and after the transaction end bit is set, the controller component 110 can facilitate transferring the modified subsets of data from the transfer buffer component 106 to the respective memory locations specified in the transaction, and the controller component 110 can facilitate copying the unchanged subsets of data (e.g., subsets 1 and 8-10) to respective new memory locations or the unchanged subsets of data can remain in the original memory locations, where the desired memory locations can be specified in the transaction command.

Turning back to the memory component 102, memory component 102 can comprise nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), Rambus direct RAM (RDRAM), direct Rambus dynamic RAM (DRDRAM), and/or Rambus dynamic RAM (RDRAM).

Figure 2:
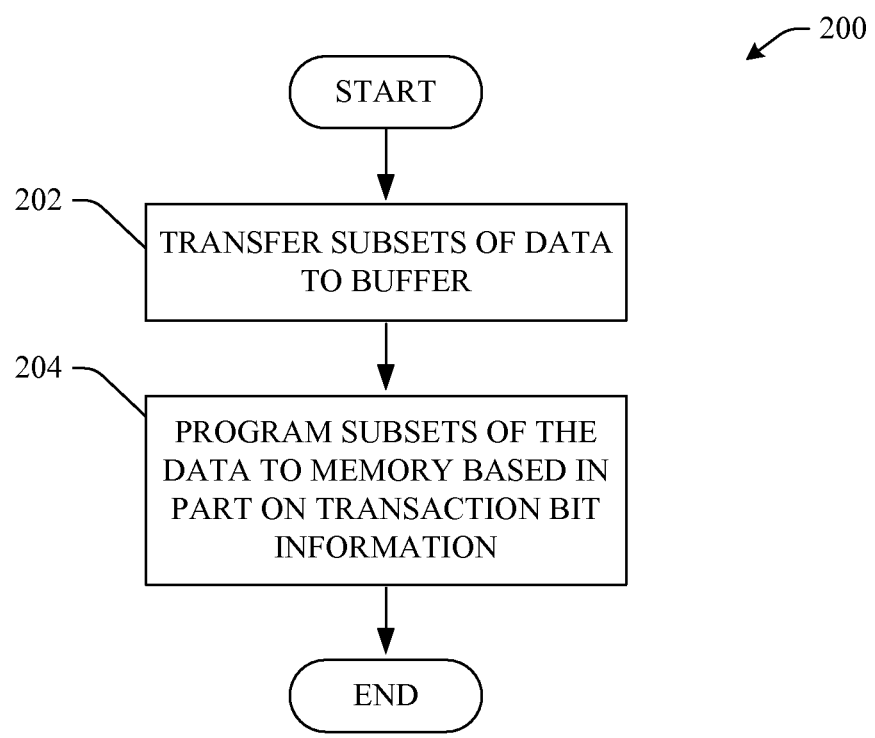
FIG. 2 illustrates an example methodology that can avoid partial storage of new data in accordance with an aspect of the subject innovation.
Figure 3:
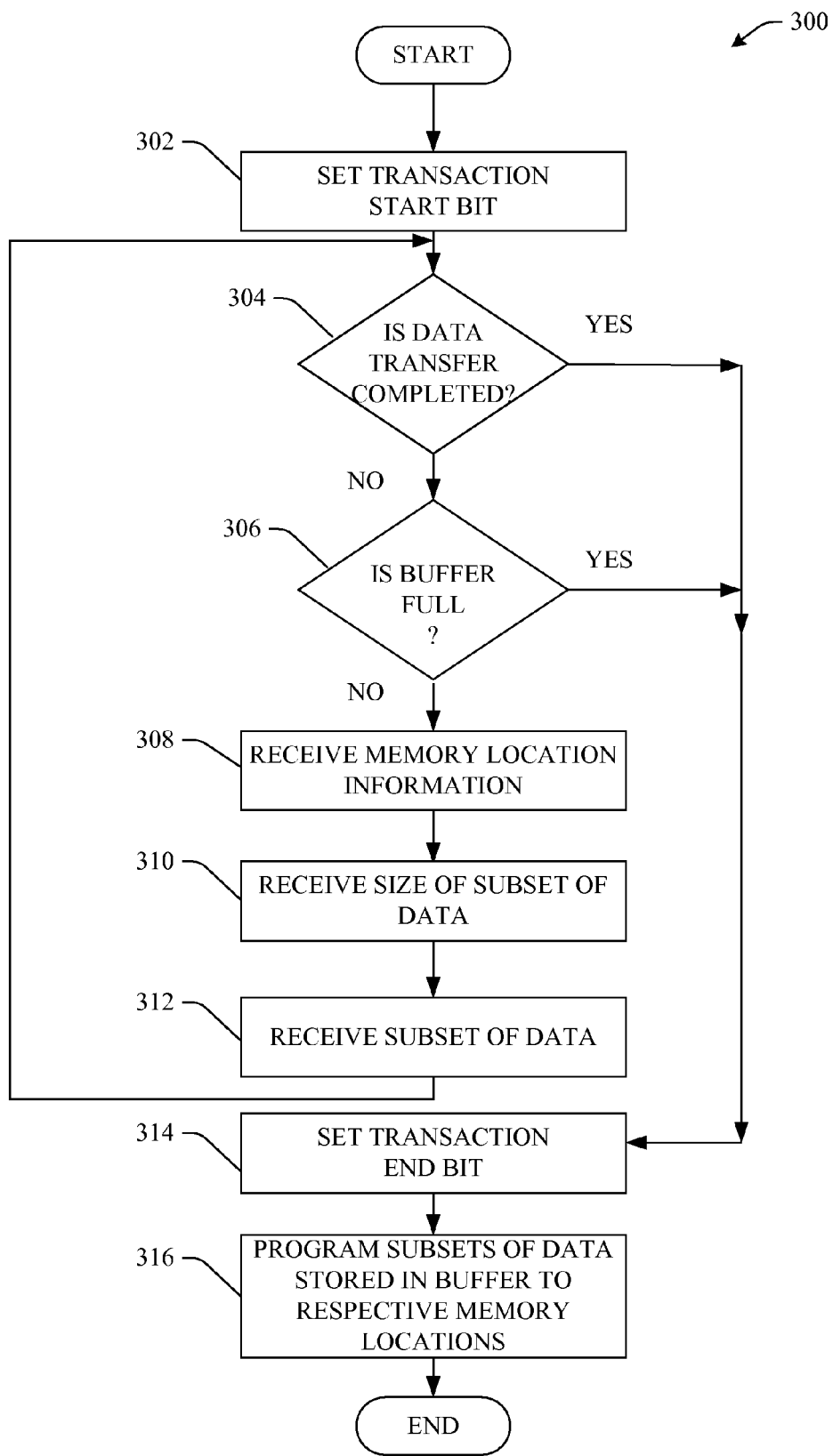
FIG. 3 illustrates an example methodology that can be employed to reduce errors while transferring user data to non-contiguous memory locations, according to an aspect of the disclosed subject innovation.
Figure 4:
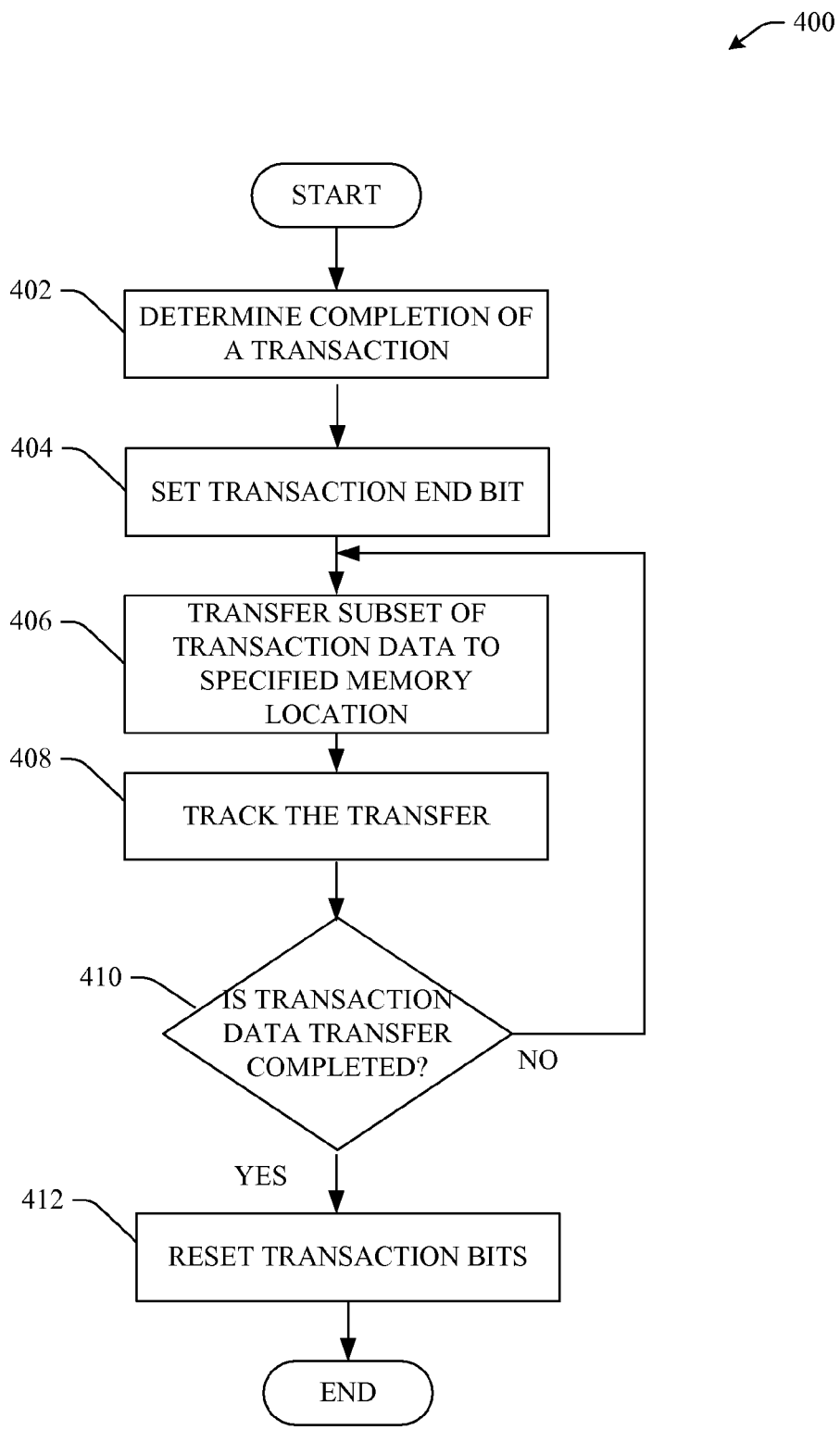
FIG. 4 illustrates an example methodology that transfers user data from a buffer in the memory to the appropriate memory location, according to an aspect of the innovation.

FIGS. 2, 3 and 4 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 2, illustrated is an example methodology 200 that can facilitate storing data in accordance with an aspect of the disclosed subject matter. At 202, one or more subsets of data can be transferred to a transaction buffer component (e.g., 106). The subsets of data can be part of a transaction that can include, but is not limited to a program, copy and or edit (e.g., update) operation associated with memory (e.g., memory 102). In one aspect, a transaction buffer component can receive a subset of data along with a size of the subset and an address of a memory location to which the subset of data can be copied. Furthermore, the transfer buffer component can receive one or more subsets of data and information associated with the data that can be stored in contiguous or non-contiguous memory locations. At 204, the subsets of data can be programmed to memory based in part on transaction bit information. In accordance with an aspect, a controller component can facilitate transferring the subsets of data from the transaction buffer component to the specified memory locations when a transaction end bit is set. In one aspect, the data stored in the transaction buffer component can remain in the transaction buffer component and is not transferred to specified memory locations until the transaction bit component (e.g., 108) sets the transaction end bit. Thus, partial data associated with the transaction is not stored in the specified memory locations if the transaction is interrupted at any point. Data can be transferred to the specified memory locations only once all the data associated with a transaction is completely received and stored in the transaction buffer component in the memory. If power is lost during the transfer of data from the transaction buffer component to the respective memory locations (e.g., which can occur after the transaction end bit has been set), the transfer can be restarted from a point where the interruption occurred when power is regained.

FIG. 3 illustrates an example methodology 300 that can be employed to facilitate reducing errors while transferring user data to memory locations, according to an aspect of the disclosed subject innovation. At 302, a transaction start bit can be set. In one aspect, a transaction bit component (e.g., 108) can determine the beginning of a transaction and set the transaction start bit. As an example, the transaction start bit can be set when an application programming interface (API) initiates a transaction associated with the memory (e.g., memory 102). As another example, the transaction bit can be set when a flag associated with the start of a transaction is received by the transaction bit component.

At 304, a determination can be made regarding whether the transaction is complete. A transaction can comprise of one or more subsets of data that can be programmed to one or more contiguous and/or non-contiguous memory locations in a memory (e.g., 102), where the subsets of data can initially be transmitted to a transaction buffer component (e.g., 106). If it is determined that the transaction is completed, methodology 300 can proceed to reference numeral 314, where a transaction end bit can be set, as further described herein. However, if, at 304, it is determined that the transaction is not completed, at 306, it can be determined whether the transaction buffer component is full. In one aspect, the transaction buffer component can be employed to temporarily store user data in the memory to facilitate reducing errors associated with transactions, such as transactions involving a large amount of data. In one aspect, the transaction buffer component can comprise nonvolatile memory. If it is determined that the transaction buffer component is full, methodology 300 can proceed to reference numeral 314, where the end transaction bit can be set as more fully described herein. If at 306, it is determined that the transaction buffer component is not full, at 308, information regarding a memory location can be received, such as, but not limited to, a memory address associated with the memory location in the memory, wherein the subset of data can be stored. At 310, a size of the subset of data to be transferred to the memory location can be received. In one aspect, the size of the subset of data can be based in part on the size of the buffer location in the transaction buffer component, for example. At 312, the subset of data can be received. As an example, the subset of data can be received by the transaction buffer component in the memory to temporarily store the subset of data along with the information associated with the data, such as, the size and/or memory address.

The acts 304-312 can be repeated until the transaction is completed, such that, either the user data is completed and/or the transaction buffer component is full. When the transaction is completed, at 314, a transaction end bit can be set. In one aspect, the transaction bit component can facilitate setting the transaction end bit based in part on received information (e.g., information received with the command, an end command, a flag indicating an end of the transaction, etc.) indicating that the transaction is completed. At 316, the subsets of data stored in the transaction buffer component can be programmed into respective memory locations. In one aspect, a controller component can facilitate transferring the data stored in the transaction buffer component to the appropriate memory locations based in part on the information (e.g. memory address, size) associated with the subset of data stored in the transaction buffer component.

Thus, data can be temporarily stored in the transaction buffer component in the memory and can be transferred to appropriate memory locations only after the entire data associated with the transaction has been stored in the transaction buffer component. Conventionally, if an interruption occurs during a transaction, only the portion of the incoming data that has already been written to the memory is stored in the memory, and the remaining data associated with the transaction is lost, which can lead to errors in the data. According to an aspect of the subject innovation, the subsets of data associated with a transaction are initially stored in a transaction buffer component, and the original data remains intact in respective memory locations in the memory array. If an interruption occurs before a transaction is completed, the partial data received in the transaction buffer component can be disposed of, while the memory can retain the original data. Thus, partial data storage in memory can be avoided by transferring user data to the specified memory locations only once the entire transaction is complete and all the user data has been received by the transaction buffer component. Furthermore, if an interruption occurs during the transfer of data from the transaction buffer component to the appropriate memory locations due to, for example, power loss, the transfer can be completed once power is regained, since user data associated with the transaction is in the transaction buffer component.

As an example, a transaction can be initiated to store data in non-contiguous memory locations A and B. A transaction start bit can be set. The memory address of location A can be received along with the size of the data to be stored at memory location A (e.g. 10 bytes) and the data to be stored at the memory location A. This information associated with the transaction can temporarily be stored in a transaction buffer component in the memory. Further, the memory address of location B can be received along with the size of the data to be stored at memory location B (e.g., 5 bytes) and the data to be stored at the memory location B. Once this data has been stored in the transaction buffer component, the transaction can be completed and the transaction end bit can be set. When the transaction end bit is set, the data from the transaction buffer component can be transferred to the respective memory locations, for example, by a controller component. Thus, the 10 bytes of data from the transaction buffer component associated with memory location A can be stored in memory location A and the 5 bytes of data from the transaction buffer component associated with memory location B can be stored in memory location B.

FIG. 4 illustrates an example methodology 400 that can facilitate transferring user data from a transaction buffer component in the memory to the appropriate memory location, according to an aspect of the subject innovation. At 402, it can be determined whether a transaction has been completed. In one aspect, if the transaction has been completed and the user data has been completely transferred to a transaction buffer component in the memory, at 404, a transaction end bit can be set. At 406, a subset of transaction data can be transferred to a specified memory location. As an example, a controller component can determine the end of a transaction based in part on the transaction bit information and transfer transaction data from a transaction buffer component to a specified memory location based in part on the information associated with the data, such as, but not limited to, a memory address, size of data, etc.

At 408, the transfer of data can be tracked. Most any tracking mechanism can be employed, for example, a flag can be set to indicate that a subset of data has been transferred, the number of transfers related to the transaction can be known by the controller component, etc. In one aspect, the controller component can track the transfer of transaction data from the transaction buffer component to the respective memory location. Once the data is transferred to the respective memory location and stored therein, the controller component can flag the data in the transaction buffer component to indicate a successful transfer. Thus, if an interruption occurs during this transfer, the transfer can resume from a point where the interruption occurred and successfully complete the transaction without partial storage of data.

At 410, it can be determined whether the transfer to the respective memory locations is completed. A transaction can comprise one or more subsets of data associated with an operation (e.g., program operations) to store data in contiguous or non-contiguous memory locations in the memory. In accordance with one aspect, only those memory locations that have been modified in the transaction can be updated. Acts 406-410 can be repeated until all of the subsets of data have been successfully transferred, for example, from the transaction buffer component to the desired memory locations in the memory. At 412, the transaction bits can be reset. In one example, a transaction bit component can determine that a transaction has been successfully completed and can reset a transaction start bit and a transaction end bit.

According to one aspect, one or more transfer bits can be employed to determine the beginning and end of the transfer of data from the transaction buffer component to the specified memory locations. For each subset of data associated with a transaction, a transfer start bit can be set, for example, when a transaction is completed and a transaction end bit is set and/or when a transfer of a previous subset of data is completed and the transfer end bit for the previous subset of data is set. When the transfer start bit is set, a subset of data can be transferred from the transaction buffer component to the specified memory location(s). After the subset of data is transferred and stored in the desired memory location(s), a transfer end bit can be set with respect to that subset of data, and a transfer start bit can be set with respect to the next subset of data being transferred from the transaction buffer component to a specified memory location, and this can continue until all the subsets of data are transferred to the respective memory locations in the memory array. If an interruption occurs during a transfer, for example, due to power loss, when power is regained, the transfer will resume since the transfer end bit is not set. For example, the controller component 110 can facilitate determining the status of a data transfer and can resume from the point of the last successful data transfer to complete the remaining data transfers associated with the transaction.

Figure 5:
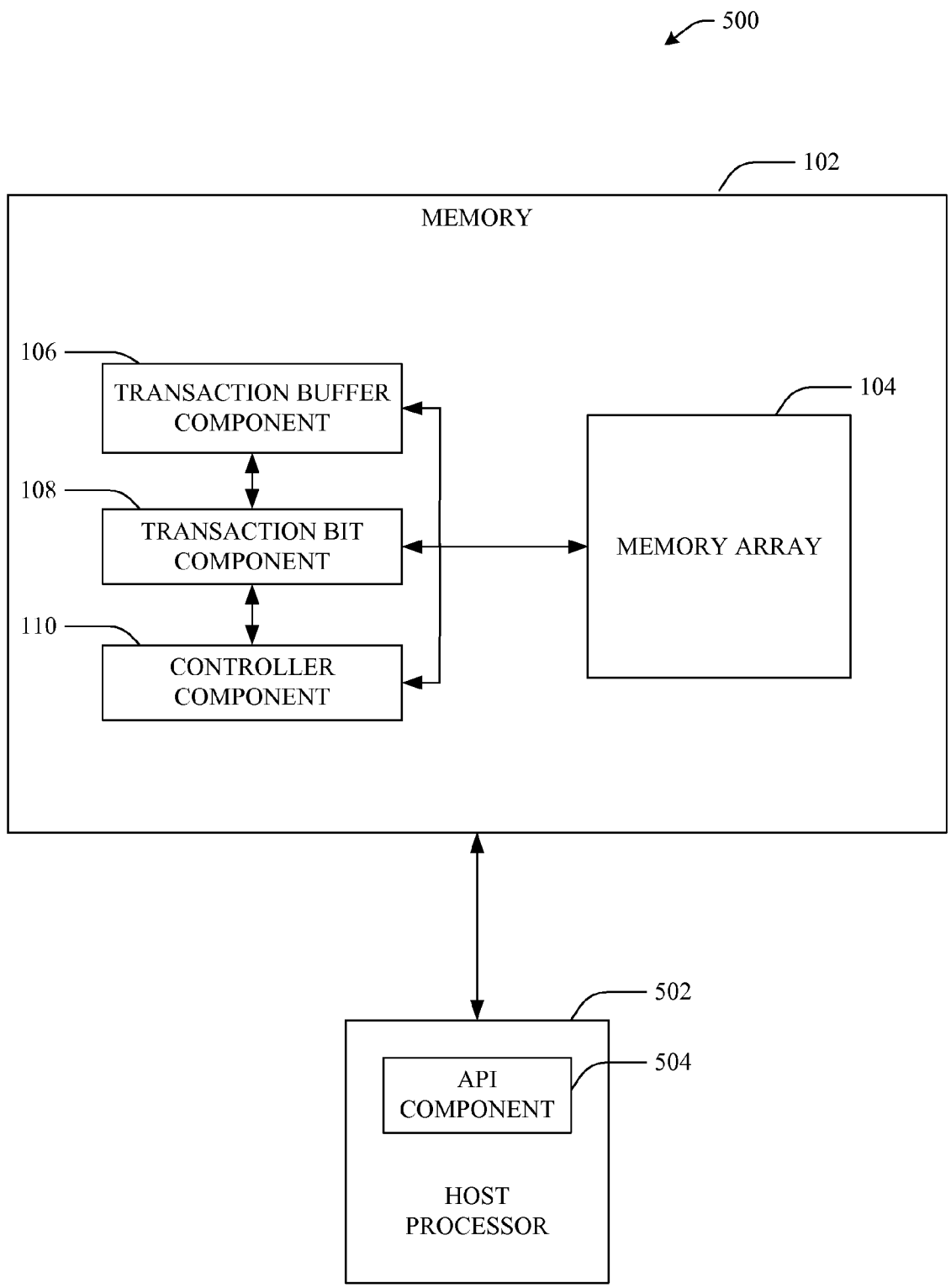
FIG. 5 illustrates a system that can avoid an error during data commit on multicycle pass complete in accordance with an aspect of the subject innovation.

Referring now to FIG. 5, there illustrated is an example system 500 that can that can avoid an error during data commit on multicycle pass complete in accordance with an aspect of the subject innovation. The system can include a memory 102 that can be a non-volatile memory such as a flash memory (e.g., single-bit flash memory, multi-bit flash memory). The memory 102 can be comprised of NOR flash memory and/or NAND flash memory, for example. The memory 102 can include a memory array 104 that can be comprised of a plurality of memory cells (not shown) wherein data can be stored, as more fully described herein.

The memory 102 can further include a transaction buffer component 106 that can temporarily store user data, a transaction bit component 108 that can determine the beginning and end of a transaction and a controller component 110 that can program memory locations based on the data from the transaction buffer component 106 and transaction bit component 108. The user data associated with a transaction is temporarily stored in the transaction buffer component 106 and only once the transaction is complete, the controller component 110 transfers the data from the transaction buffer component 106 to the memory array 104. Hence, if the transaction is interrupted at any point before completion, the memory array 104 will not comprise partially stored corrupt data.

Typically, the system can include a host processor 502 associated with the memory 102 that can issue commands. The host processor 502 can be a typical applications processor that can manage communications and run applications. For example, the host processor 502 can be a processor that can be utilized by a computer, a mobile handset, personal data assistant (PDA), or other electronic device.

The host computer 502 can issues commands to initiate an operation, such as, but not limited to, a program, read or erase operation. When the transaction is initiated, a transaction start bit is set. The host processor 502 can perform the transaction and on its completion, a transaction end bit can be set.

The host computer 502 can include an application programming interface (API) component 504 that can be employed to perform a transaction with the memory. The API component 504 can provide an interface for a user to perform a transaction. The user can employ the API component 504 to provide memory 102 with information associated with a transaction, such as, but not limited to, user data, memory address, size of data, etc. As an example, the user can employ the following set of command to perform the transaction:

---
CFI/ONFI Write Transaction Start Command: 0xAA
 <Set Transaction Start bit to Zero>
Write flash address 0x10000
 <Write flash address 0x10000 to Transaction buffer>
Write data size 0x200
 <Write flash data size 0x200 to Transaction buffer>
Write data [1,2,3,4,5,6,7,8,....]
 <Write flash data to Transaction buffer>
Write flash address x020000
 <Write flash address 0x20000 to Transaction buffer>
Write data size 0x100
 <Write flash data size 0x100 to Transaction buffer>
Write data [6,7,8,9,0,....]
 <Write flash data to Transaction buffer>
CFI/ONFI Write Transaction Stop command 0xBB
 <Set Transaction Stop bit to Zero>
 <Commence Transfer of data to main flash array>
 <Complete Transfer of data to main flash array>
 <Erase Transfer Flash Buffer, including Transaction Start and Stop Bits>
---

Figure 6:
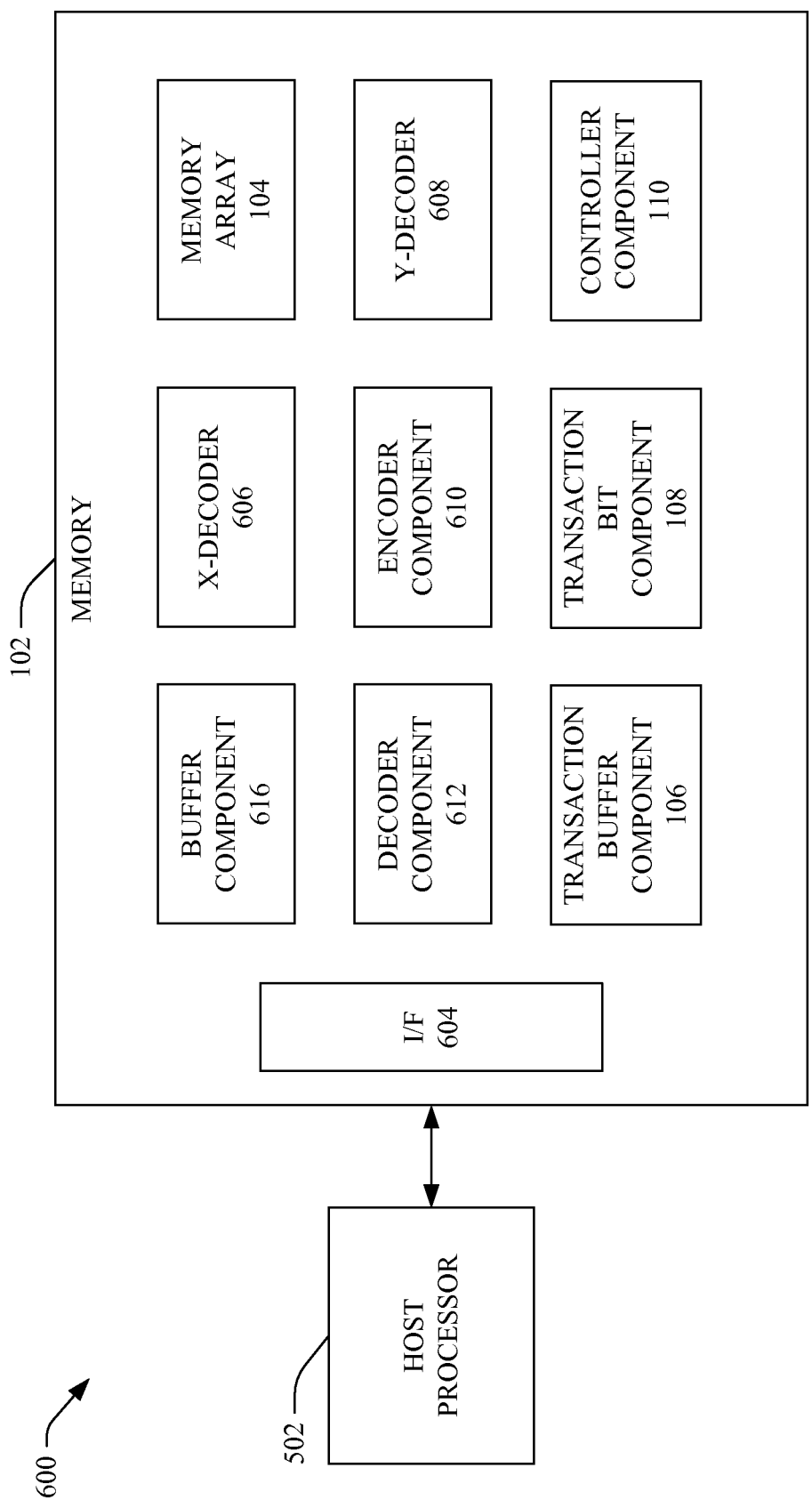
FIG. 6 illustrates an example block diagram of a system that can avoid errors during data commit associated with a memory in accordance with the disclosed subject matter.

Referring to FIG. 6, depicted is a block diagram of another system 600 that can avoid errors during data commit associated with a memory in accordance with the disclosed subject matter. System 600 illustrates various components of memory 102 associated with a host processor 502. It can be appreciated that the memory 102, memory array 104, transaction buffer component 106, transaction bit component 108 and controller component 110 can each include their respective functionality, as more fully described herein, for example, with regard to systems 100, 500.

System 600 can contain a host processor 502 that can be associated with the memory 102. In accordance with an embodiment of the disclosed subject matter, the host processor 502 can generate commands, including read, write, and/or erase commands, in order to facilitate reading data from, writing data to, and/or erasing data from the memory 102, where the communication of information between the host processor 502 and the memory 102 can be facilitated via an interface component 604 (hereinafter also referred to as "I/F 1004").

I/F 604 can include and/or provide various adapters, connectors, channels, communication paths, etc. to integrate the memory 102 into virtually any operating and/or database system(s) and/or with one another system(s). In addition, I/F 604 can provide various adapters, connectors, channels, communication paths, etc., that can provide for interaction and/or communication with the host processor 502, and/or any other component, data, and the like, associated with the system 600.

The memory 102 can include an X-decoder component 606 and a Y-decoder component 608 that can be associated with the memory array 104 and can each respectively decode inputs/outputs during various operations (e.g., programming, reading, verifying, erasing) that can be performed on the memory cells (not shown), as more fully described herein. For example, the X-decoder component 606 and Y-decoder component 608 can each receive address bus information, which can be provided as part of a command from the host processor 502 or a command from a memory controller component (not shown) within the memory 102, and such information can be utilized to facilitate determining the desired memory location in the memory 102.

The memory 102 can also contain an encoder component 610 that can facilitate encoding data being programmed to the memory 102. For example, the encoder component 610 can facilitate converting a digital signal to an analog signal (e.g., current level) to facilitate programming data in the memory locations (e.g., memory cells) in the memory 102.

The memory 102 can further include a decoder component 612 that can facilitate decoding data being read from the memory 102. The decoder component 612 can receive an analog signal associated with data, where the analog signal can be stored in the memory location in the memory array 104, and can facilitate converting the analog signal to a digital signal, so that such digital signal representing the read data can be provided to another component (e.g., host processor 502, cryptographic component (as described herein), etc.) for further processing.

Figure 7:
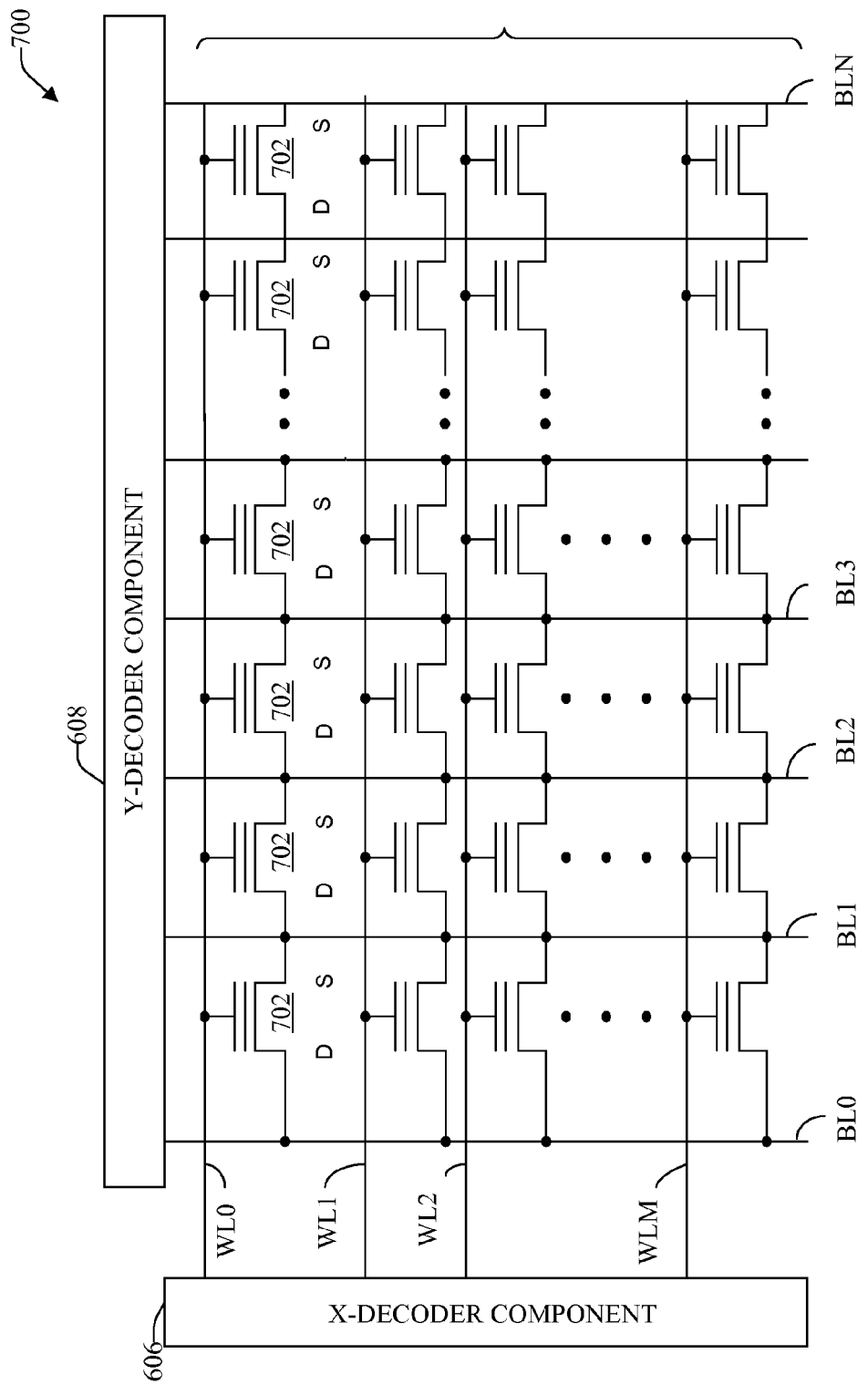
FIG. 7 illustrates an example memory array that can be employed in a memory in accordance with an aspect of the disclosed subject matter.

Turning to FIG. 7, depicted is an example diagram 700 of a memory array 104 (e.g., as illustrated in FIG. 1 and described herein) that can be employed in a memory 102 (e.g., as illustrated in FIG. 1 and described herein) in accordance with an aspect of the disclosed subject matter. The diagram 700 of the memory array 104 can include a plurality of memory cells 702 that each can be comprised of a drain, gate, and source. Each memory cell 702 can have one or more levels therein and can thereby store one or more bits of data therein, where each level can be associated with a bit of data. The levels can store a tag associated with the memory cell 702 that can be modified during the beginning and end of a transaction to avoid errors during data commit. The memory array 104 can be included in a memory 102 (not shown in its entirety). The memory array 104 can be associated with an X-decoder component 606 (e.g., WL decoder) and a Y-decoder component 608 (e.g., BL decoder) that can each respectively decode inputs/outputs during various operations (e.g., programming, reading, verifying, erasing) that can be performed on the memory cells 702. The X-decoder component 606 and Y-decoder component 608 can each receive address bus information from a host processor (e.g., 502) and/or system controller (not shown) or the like, and can utilize such information to facilitate accessing or selecting the desired memory cell(s) (e.g., memory location(s)) associated with the command. The memory cells 702 can be formed in M rows and N columns. A common WL (word line) can be attached to the gate of each memory cell 702 in a row, such as word-lines WL0, WL1, WL2, through WLM. A common BL (bit line) can be attached to each cell 702 in a column, such as bit-lines BL0, BL1, through BLN. A WL can contain, for example, 1024 elements forming multiple words and a sector can include, for example, 512 WLs to provide at least 512 k elements of memory. In accordance with an aspect of the disclosed subject matter, respective voltages can be applied to one or more cells 702 through the WLs and BLs to facilitate performing operations, such as program, read, erase, and the like.

Figure 8:
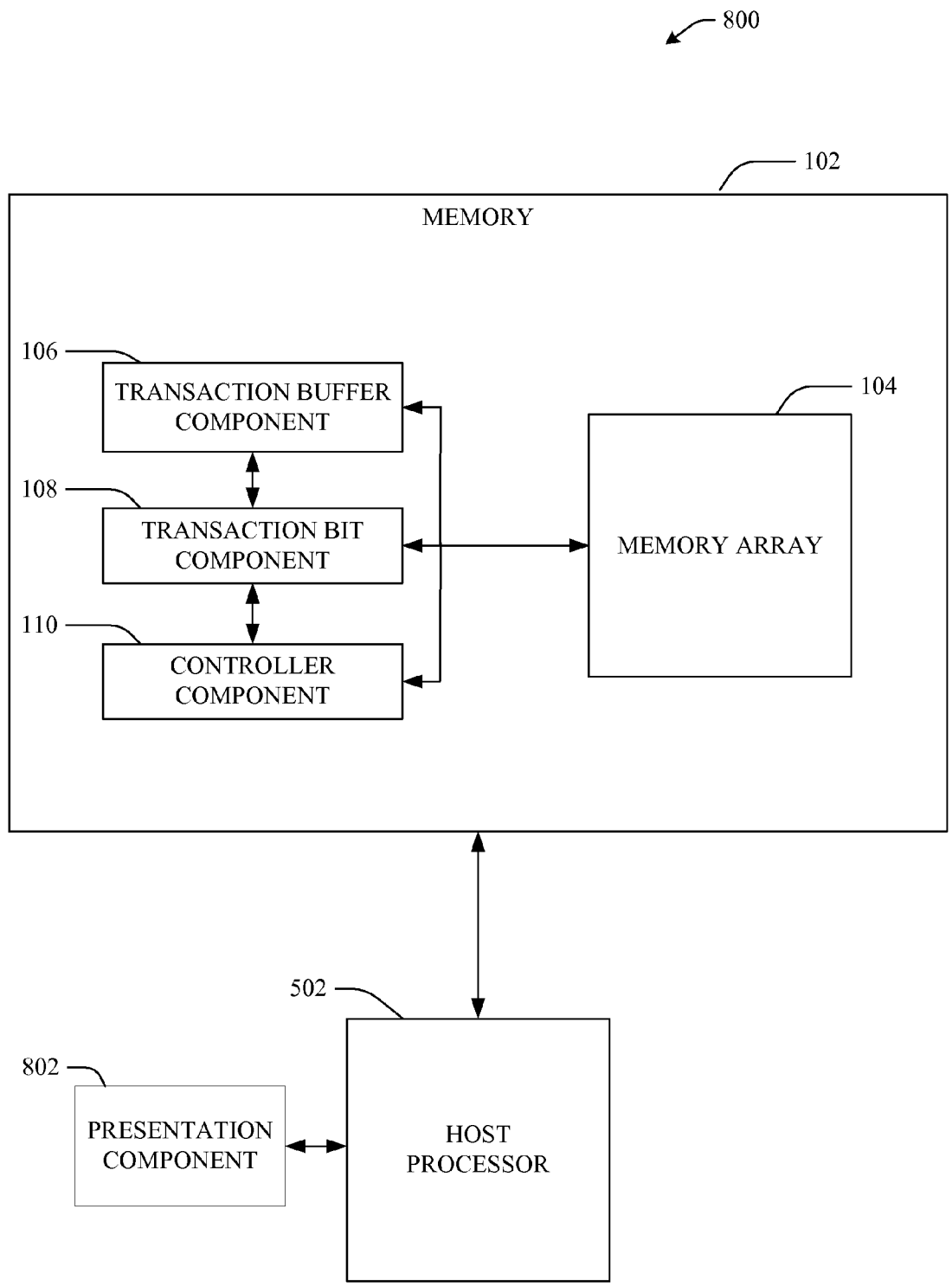
FIG. 8 illustrates a system that can facilitate error prevention on data commit in a memory during a transaction in accordance with an aspect of the disclosed subject matter.

Turning to FIG. 8, depicted is a system 800 that can facilitate error prevention on data commit in a memory during a transaction in accordance with an aspect of the disclosed subject matter. System 800 can include a host processor 502, memory 102 (e.g., flash memory), a transaction buffer component 106, a transaction bit component 108 and a controller component 110 that each can be substantially similar to respective components and can include such respective functionality as described herein, for example, with regard to system 100, system 500, and/or system 600.

System 800 also can include a presentation component 802, which can be associated with the host processor 502. The presentation component 802 can provide various types of user interfaces to facilitate interaction between a user and any component coupled to the host processor 502. As depicted, the presentation component 802 is a separate entity that can be utilized with the host processor 502 and associated components. However, it is to be appreciated that the presentation component 802 and/or similar view components can be incorporated into the host processor 502 and/or a stand-alone unit. The presentation component 802 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 502.

The user can also interact with the regions to select and provide information via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
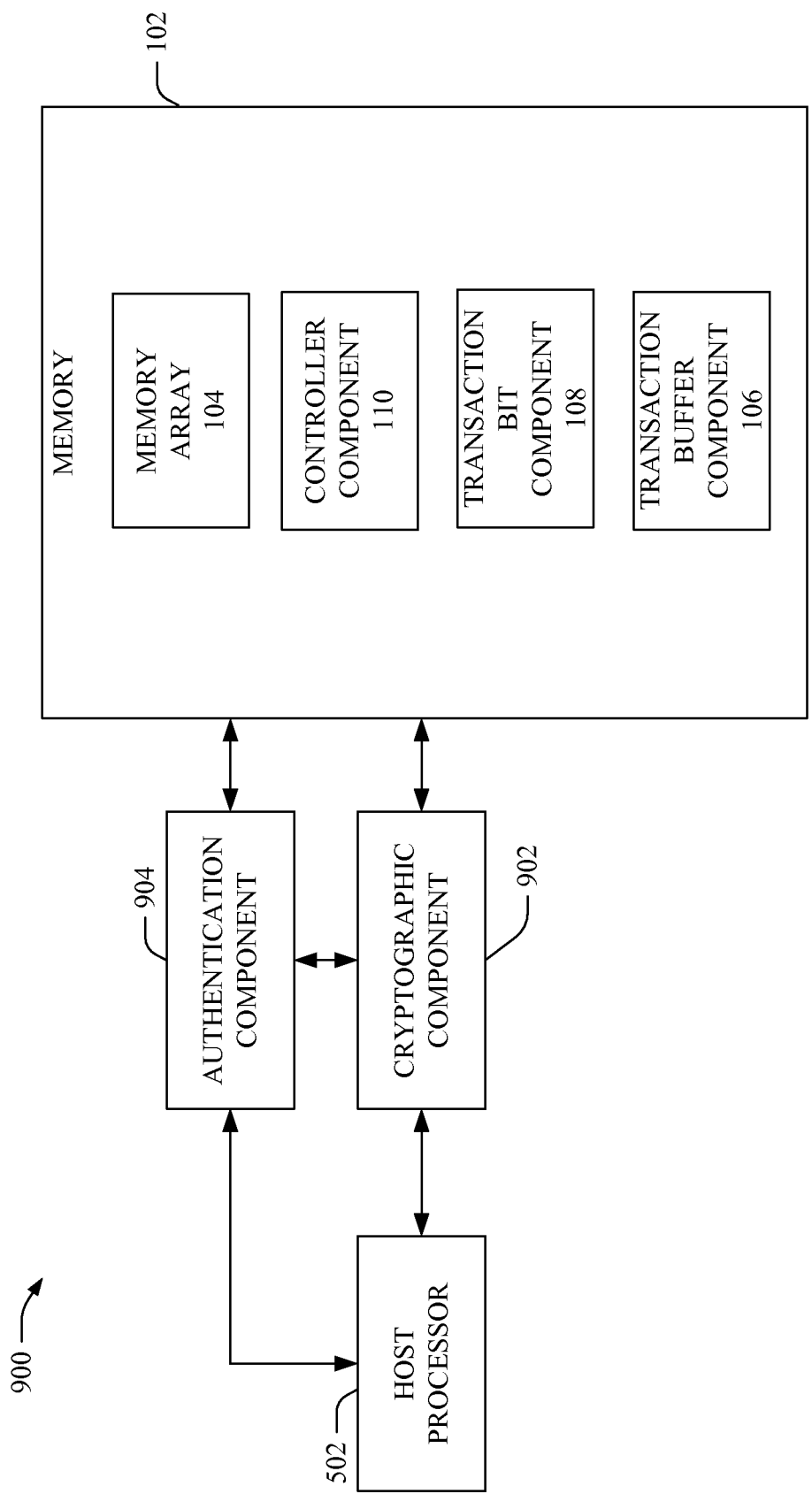
FIG. 9 illustrates a system that can facilitate a prevention of data commit errors in a memory associated with transactions that involve secured data in accordance with an aspect of the disclosed subject matter.

Referring to FIG. 9, a block diagram of a system 900 that can facilitate a prevention of data commit errors in a memory associated with transactions that involve secured data in accordance with an aspect of the disclosed subject matter is illustrated. System 900 can include a host processor 502 that can be associated with a memory 102, which can be a flash memory device, for example. The memory 102 can include a memory array 104 in which data can be stored, a transaction buffer component 106 that can temporarily store information associated with the transaction, a transaction bit component that can set/reset a transaction start and/or stop bit and a controller component that can program subsets of data from the transaction buffer component 106 to the respective memory locations in memory array 104. It is to be appreciated that the memory 102, memory array 104, transaction buffer component 106, transaction bit component 108, controller component 110 and host processor 502 can each include their respective functionality, as more fully described herein, for example, with regard to system 100, system 500, and/or system 600.

The host processor 502 can be associated with a cryptographic component 902 that can facilitate encrypting and/or decrypting data to facilitate securing data being written to, stored in, and/or read from the memory 102. In accordance with an aspect of the disclosed subject matter, cryptographic component 902 can provide symmetric cryptographic tools and accelerators (e.g., Twofish, Blowfish, AES, TDES, IDEA, CAST5, RC4, etc.) to facilitate securing data. Cryptographic component 902 can also provide asymmetric cryptographic accelerators and tools (e.g., RSA, Digital Signature Standard (DSS), and the like) to facilitate data security. Additionally, cryptographic component 902 can provide accelerators and tools (e.g., Secure Hash Algorithm (SHA) and its variants such as, for example, SHA-0, SHA-1, SHA-224, SHA-256, SHA-384, and SHA-512) to facilitate data security.

System 900 can further include an authentication component 904 that can solicit authentication data from an entity, and, upon the authentication data so solicited, can be employed, individually and/or in conjunction with information acquired and ascertained as a result of biometric modalities employed, to facilitate control access to the memory 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 904. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 904 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one embodiment of the disclosed subject matter, the memory 102, the cryptographic component 902, and the authentication component 904 can be situated or implemented on a single integrated-circuit chip. In accordance with another embodiment, the memory 102, the cryptographic component 902, and the authentication component 904 can be implemented on an application-specific integrated-circuit (ASIC) chip.

Figure 10:
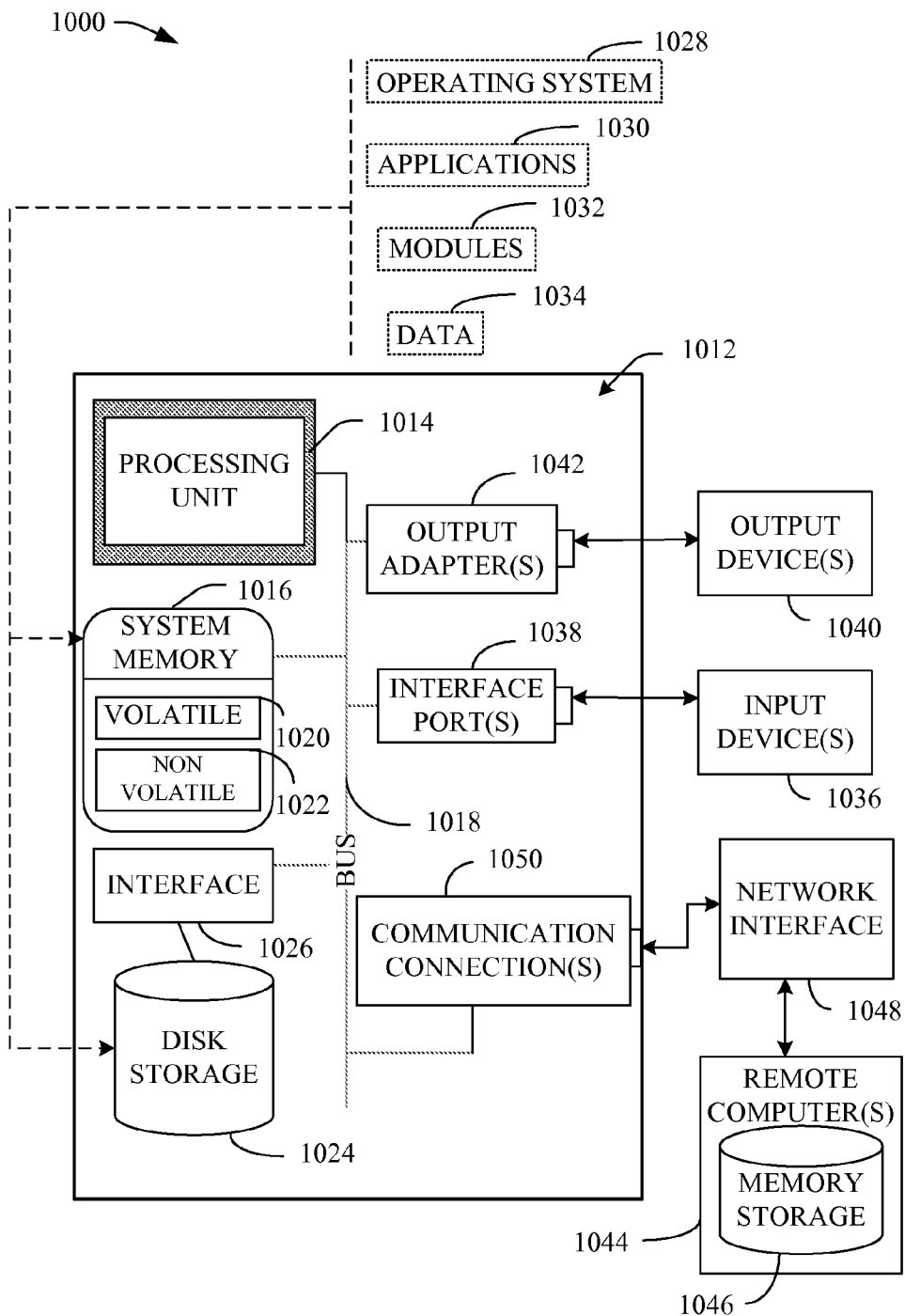
FIG. 10 is a schematic block diagram illustrating a suitable operating environment in accordance with an aspect of the subject innovation.
Figure 11:
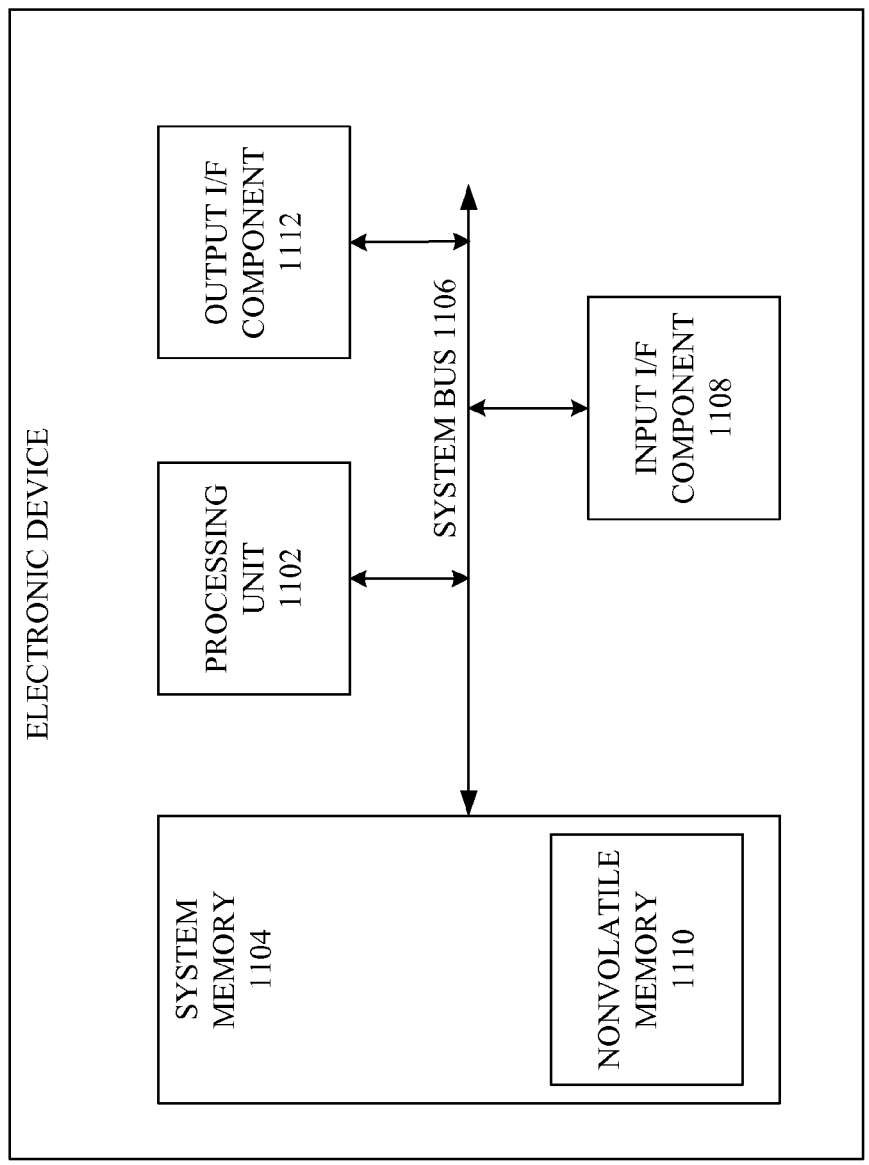
FIG. 11 illustrates a block diagram of an exemplary electronic device that can utilize a memory device(s), according to an aspect of the disclosed innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed innovation can be practiced on stand-alone computers. In a distributed computing environment, program modules may be located in both local and remote memory storage devices.

With reference to FIG. 10, a suitable environment 1000 for implementing various aspects of the disclosed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1494), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include ROM, PROM, EPROM, EEPROM, FeRAM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Referring to FIG. 11, illustrated is a block diagram of an exemplary, non-limiting electronic device 1100 that can incorporate system 100, system 500, system 600, system 800 and/or system 900, or a portion(s) thereof. The electronic device can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a personal digital assistant (PDA), a portable email reader, a digital camera, an electronic game, an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), secure memory devices with computational capabilities, devices with tamper-resistant chips, an electronic device associated with an industrial control system, an embedded computer in a machine (e.g., an airplane, a copier, a motor vehicle, a microwave oven), and the like.

Components of the electronic device 1100 can include, but are not limited to, a processing unit 1102, a system memory 1104 (with nonvolatile memory 1110), and a system bus 1106 that can couple various system components including the system memory 1104 to the processing unit 1102 (e.g., which can be the same or similar as the host processor 502). The system bus 1106 can be any of several types of bus structures including a memory bus or memory controller, a peripheral bus, or a local bus using any of a variety of bus architectures.

Electronic device 1100 can typically include a variety of computer readable media. Computer readable media can be any available media that can be accessed by the electronic device 1100. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1110 (e.g., flash memory) or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1100. Communication media typically embodies computer readable instructions, data structures, program modules or other data in a modulated data signal such as a carrier wave or other transport mechanism and includes any information delivery media.

The system memory 1104 includes computer storage media in the form of volatile and/or nonvolatile memory, such as nonvolatile memory 1110. A basic input/output system (BIOS), containing the basic routines that help to transfer information between elements within electronic device 1100, such as during start-up, can be stored in memory 1104. Memory 1104 typically also contains data and/or program modules that can be immediately accessible to and/or presently being operated on by processing unit 1102. By way of example, and not limitation, system memory 1104 can also include an operating system, application programs, other program modules, and program data.

The nonvolatile memory 1110 can be removable or non-removable. For example, the nonvolatile memory 1110 can be in the form of a removable memory card or a USB flash drive. In accordance with one aspect, the nonvolatile memory 1110 can include flash memory (e.g., single-bit flash memory, multi-bit flash memory), ROM, PROM, EPROM, EEPROM, or NVRAM (e.g., FeRAM), or a combination thereof, for example. Further, the flash memory can be comprised of NOR flash memory and/or NAND flash memory. It is to be appreciated that non-volatile memory 1110 can be the same or similar as, and/or can contain the same or similar functionality as, memory 102, as illustrated in FIG. 1 and other figures and described herein.

A user can enter commands and information into the electronic device 1100 through input devices (not shown) such as a keypad, microphone, tablet or touch screen although other input devices can also be utilized. These and other input devices can be connected to the processing unit 1102 through input interface component 1108 that can be connected to the system bus 1106. Other interface and bus structures, such as a parallel port, game port or a universal serial bus (USB) can also be utilized. A graphics subsystem (not shown) can also be connected to the system bus 1106. A display device (not shown) can be also connected to the system bus 1112 via an interface, such as output interface component 1112, which can in turn communicate with video memory. In addition to a display, the electronic device 1100 can also include other peripheral output devices such as speakers (not shown), which can be connected through output interface component 1112.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

What is described above includes examples of the subject innovation. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates storing data associated with a memory, comprising:
   transmitting a first subset of data from a memory array to one or more non-volatile memory blocks in the memory; and
   programming the first subset of the data from the one or more non-volatile memory blocks to a first memory location in the memory array and copying a second subset of the data from a second memory location in the memory array to a third memory location in the memory array based in part on transaction bit information, wherein the transaction bit information is identified from a command generated when an application programming interface (API) initiates a transaction to transfer the first subset of the data to the one or more non-volatile memory blocks, the command includes a size of the first subset of the data, a number of write operations associated with the first subset of the data, information associated with the first memory location in the memory array, and other information associated with the third memory location in the memory array, wherein a controller tracks transferring the first subset of the data from the one or more non-volatile memory blocks to the first memory location to allow an interruption in the transferring to resume from a point where the interruption occurred, and wherein a transaction end bit is set and the programming of the first subset of the data to the first memory location is initiated, without waiting for a next subset of data associated with a next program command to be stored in the one or more non-volatile memory blocks, in response to a determination that the transaction to transfer the first subset of the data to the one or more non-volatile memory blocks is complete.

2. The method of claim 1, further comprising, setting a transaction start bit to initiate the transaction to transfer the first subset of the data to the one or more non-volatile memory blocks.

3. The method of claim 1, wherein the information associated with the first memory location comprises at least one of a memory address or a size of the first subset of the data, or a combination thereof.

4. The method of claim 1, wherein the other information associated with the third memory location is comprises at least one of a memory address or a size of the second subset of the data, or a combination thereof.

5. The method of claim 1 further comprising, setting the transaction end bit via a transaction bit component included in the memory in response to the determination that the transaction to transfer the first subset of the data to the one or more non-volatile memory blocks is complete.

6. The method of claim 1, wherein the programming of the first subset of the data to the first memory location is initiated in response to the transaction end bit being set.

7. The method of claim 2, further comprising, resetting the transaction start bit and the transaction end bit when the transaction to transfer the first subset of the data to the one or more non-volatile memory blocks is completed.

8. The method of claim 1, further comprising, erasing the one or more non-volatile memory blocks when the transferring of the first subset of the data from the one or more non-volatile memory blocks to the first memory location is completed.

9. A system persisted on a non-transitory computer-readable medium executed by a processor that facilitates storage of data associated with a memory, comprising:
   a transaction buffer component that receives one or more subsets of user data associated with a transaction from a memory array and temporarily stores the one or more subsets of the user data associated with the transaction in one or more non-volatile memory blocks; and
   a controller component that transfers the one or more subsets of the user data from the one or more non-volatile memory blocks to specified memory locations in the memory array and copies one or more other subsets of the user data from initial memory locations in the memory array to other specified memory locations in the memory array based in part on transaction bit information associated with the transaction, wherein the transaction bit information is ascertained from a command generated by an application programming interface (API) when the API initiates a transaction to transfer the one or more subsets of the user data to the one or more non-volatile memory blocks, the command includes a number of write operations necessary to transfer the one or more subsets of the user data from the one or more non-volatile memory blocks to the specified memory locations, and a respective size of each of the one or more subsets of the user data, information associated with the specified memory locations in the memory array, and other information associated with the other specified memory locations in the memory array, wherein the controller component tracks the transfer of the one or more subsets of the user data from the one or more non-volatile memory blocks to the specified memory locations in the memory array to allow an interruption in the transferring to resume from a point where the interruption occurred, and wherein a transaction end bit is set and the transfer of the one or more subsets of the user data from the one or more non-volatile memory blocks to the specified memory locations in the memory array is initiated, without waiting for a next subset of user data associated with a next program command to be stored in the one or more non-volatile memory blocks, in response to a determination that the transaction to transfer the one or more subsets of the user data to the one or more non-volatile memory blocks is complete.

10. The system of claim 9, further comprising a transaction bit component that sets a transaction start bit at a beginning of the transaction to transfer the one or more subsets of the user data to the one or more non-volatile memory blocks and sets the transaction end bit at an end of the transaction to transfer the one or more subsets of the user data to the one or more non-volatile memory blocks.

11. The system of claim 10, wherein, the transaction bit component determines at least one of the beginning or the end of the transaction initiated by the API.

12. The system of claim 10, wherein, the at least one of the beginning or end of the transaction is determined by employing a flag.

13. The system of claim 9, wherein, the transaction buffer component receives a size associated with the one or more subsets of the user data.

14. The system of claim 9, wherein, the transaction buffer component receives a size associated with the one or more other subsets of the user data.

15. The system of claim 9, wherein the controller component determines the status of the transfer of the one or more subsets of the user data.

16. The system of claim 9, wherein the controller component selectively transfers the one or more subsets of the user data from the one or more non-volatile memory blocks to non-contiguous memory locations in the memory array.

17. The system of claim 10, wherein the controller component resets the transaction start bit and the transaction end bit when the transaction to transfer the one or more subsets of the user data to the one or more non-volatile memory blocks is successfully completed.

18. The system of claim 9, wherein the controller component erases data associated with the one or more subsets of the user data from the one or more non-volatile memory blocks in response to a determination that the one or more subsets of the user data is transferred to the specified memory locations in the memory array.

19. An electronic device comprising the system of claim 9.

* * * * *